July 15, 1969  C. J. MARTIN  3,456,120
CONTROL UNIT FOR GENERATOR POWER PLANT
Filed Dec. 30, 1966  3 Sheets-Sheet 2

INVENTOR
CASS J. MARTIN

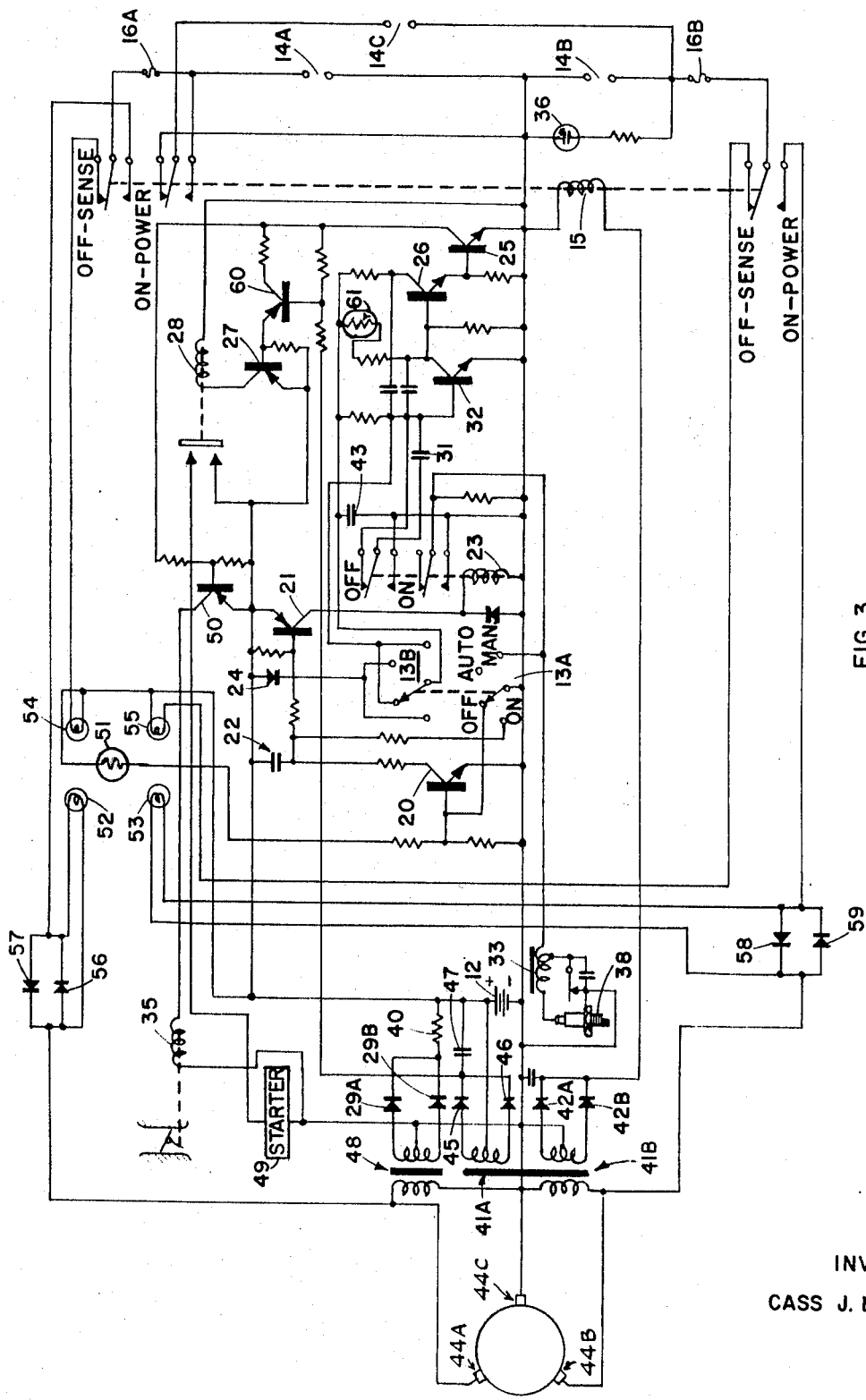

United States Patent Office 3,456,120
Patented July 15, 1969

3,456,120
CONTROL UNIT FOR GENERATOR POWER PLANT
Cass J. Martin, 8401 Nevada Ave.,
Canoga Park, Calif. 91304
Filed Dec. 30, 1966, Ser. No. 606,113
Int. Cl. H02j 9/08; H02k 23/52
U.S. Cl. 290—31                                   12 Claims

ABSTRACT OF THE DISCLOSURE

The present application provides a reliable, novel, and improved control unit for a generator power plant involving manual start-up and start-down, automatic start-up and start-down under control of externally applied load, and automatic start-up and shut-down in response to failure of a main power line source.

---

This invention relates to a control unit for a generator power plant and more particularly to a control unit capable of starting, stopping and remotely controlling a generator, driven from an internal combustion engine, under various operating modes including manual, automatic, and remote control.

Various control devices have been proposed heretofore for carrying out the start-up and shut-down operations of a generator power plant. Typical of these prior devices are control units designed to start the operation of the power plant automatically in the event of a failure of the "high-line" power source to which the generator plant is connected. Power plants of the type hereinafter considered are the auxiliary type which may be used either for a portable or field operation, or in certain instances may be connected directly to the conventional alternating current main line. In this latter instance they may be automatically started under emergency conditions resulting from the failure of the main power line. Unlike control units of the prior art, which have been designed to perform single specific functions, the control unit of the present invention is universal in its modes of operation in that it permits both manual and automatic starting under a variety of operating conditions.

The essential features of the invention comprise an electronic control circuit which is operatively connected to the starting means of an internal combustion engine and which is also connected to the electrical circuits of an AC power plant. The unit may control both the starting and stopping of the internal combustion engine as well as regulate the charging of the auxiliary battery used for starting the engine. Operating control switches and other control devices are included in the control unit as will appear hereinafter.

In a preferred embodiment the control unit of the invention will perform the following functions:

(1) Start up the generator power plant under manual start control.
(2) Shut down the operation of the power plant under manual control.
(3) Automatically start up the operation of the generator power in response to the power demand of an externally applied load.
(4) Automatically shut down the operation of the power plant in response to the removal of an external load.
(5) Automatically start up the operation of the power plant in response to the failure of a main power line source to which the generator is connected.
(6) Automatically shut down the operation of the generator in response to the re-establishment of the main power source.

Various safety features and fail-safe devices are included in the control unit of the invention together with means for insuring the reliable operation thereof. As will become apparent upon considering the description which follows, solid state components have been employed wherever possible to enhance the reliability of the device.

It is, therefore, a principal object of the invention to provide a novel and improved control unit for a generator power plant.

Another object of the invention is to provide a novel improved control unit for starting up and shutting down a generator power plant under various operating modes or operating conditions.

It is yet another object of the invention to provide a control unit for a generator power plant having features of reliability not heretofore provided by similar devices intended to accomplish generally similar functions.

It is yet another object of the invention to provide a novel and improved control unit which may be used to regulate the operation of an emergency power plant of the type which is to be connected to conventional mail power lines.

These and other objects of the invention will be more readily understood upon consideration of the following description taken in conjunction with the accompanying drawings in which:

FIGURE 3 is a schematic circuit diagram of a modification of the invention incorporating an alternate method of sensing a power load.

Figure 1:
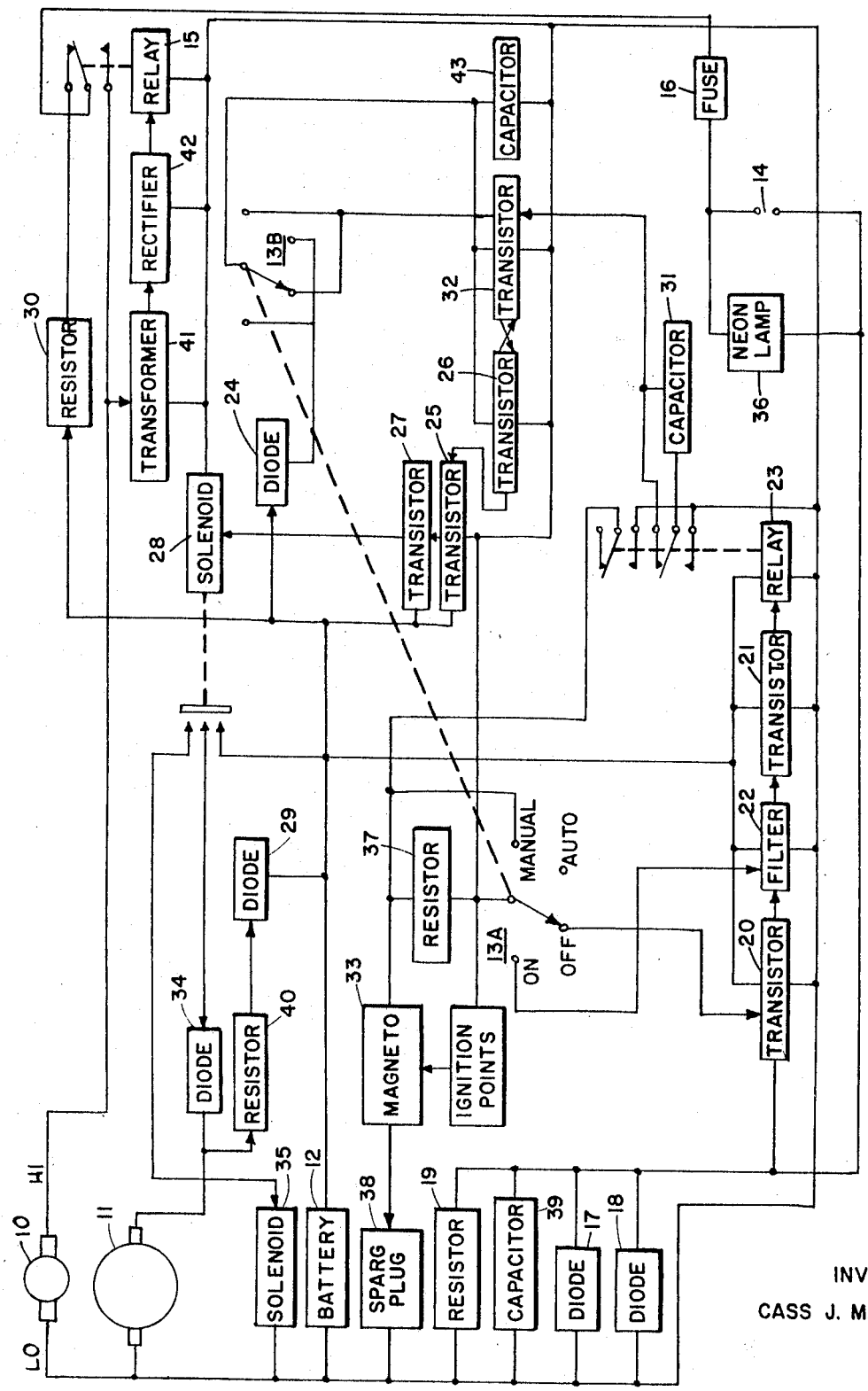
FIGURE 1 is a block diagram of a preferred embodiment of a control unit constructed in accordance with the invention.

The system shown in the block diagram of FIG. 1 comprises an AC generator 10, a DC generator (which also serves as a starting motor 11), a storage battery 12, an internal combustion engine having its drive shaft mechanically coupled to the AC generator 10 and the DC generator 11, together with the control unit of the invention. The desired operating mode of the system is set by selector switch 13A and 13B comprising a four-position rotary switch. As can be seen, switch 13A and 13B has four positions comprising the following modes of operation: (1) off, (2) on, (3) automatic, and (4) manual. When the selector switch 13 is set to the "off" position, the power plant will be shut down. The high side output of the AC generator 10 is connected to the convenience receptacle 14 via contacts on relay 15 and fuse 16. The low side of generator 10 is applied to receptacle 14 via diodes 17-18 and resistor 19. The "off" mode of operation shuts down the internal combustion engine and leaves the power plant in a standby condition which will permit it to be subsequently started either under manual or automatic control. Battery 12 is connected to the control unit via the battery input lugs through which the battery voltage is applied to various networks in the control unit. However, no battery current will flow initially inasmuch as switch 13A applies a reverse bias, in the "off" switch position, to transistor 20. This in turn places a reverse bias on transistor 21 through the filter network 22, thus causing relay 23 to be de-energized. Switch 13B, which is mechanically coupled to switch 13A, has its moving contact disconnected from diode 24, and the battery supply voltage 12.

Transistor 25, which receives its forward bias from transistor 26, will be turned off and transistor 27, which receives its forward bias from transistor 25, will also be turned off. The off conditions of transistors 27 and 25 will retain solenoid 28 in its de-energized mode. The charging control diode 29 is also connected to the battery supply voltage in such a way that it is normally reversed biased when the system is shut down so no current will flow through the path from the battery to DC generator 11. In the "off" mode, there are no paths open to any battery current flow, except for the possibility that a load might be connected to the output receptacle 14. A load connected across receptacle 14 will cause battery current to flow through resistor 30, relay contacts 15, fuse 16, AC receptacle 14, and the combination of diode 18 and resistor 19. As can be seen, the circuit condition set by the "off" position of switch 13 does not permit a start cycle to be actuated unless switch 13 is turned to either the "on" position or the "automatic" position.

As will be apparent, the "off" position in actuality may be considered as a standby condition since it permits the control unit to activate the power plant upon switching to an appropriate operating mode. The standby condition exists when capacitor 31 is discharged which is accomplished via relay contacts 23 in the de-energized mode. The other operating condition is that the timing capacitor, within the one-shot circuit of transistors 32 and 26, is also discharged by means of swich 13B. This latter condition will be described more fully hereinafter in connection with FIG. 2.

The "on" mode of operation is selected when it is intended that the power plant be started up for local or field use. Upon advancing switch 13 from the "off" to the "on" position several events will occur simultaneously, all of which will control the starting of the internal combustion engine and cycle the entire system through its start cycle to result in a running mode of operation.

The following events occur in response to advancing switch 13 to the "on" position.

Upon turning the switch 13 to "on," the delay circuit 22 will be energized. The trigger pulse to the one-shot circuit 32 and 26 will be delayed for a given time. Relay 23 will be energized via the delay and filter network 22 and driver transistor 21. Concurrently, the primary of magneto coil 33 will be reset to its operating condition by the lower contacts of relay 23. At the same time the trigger pulse as applied to the one-shot circuit 32 and 26 will be formed by capacitor 31 as the upper arm of relay 23 is switched to the grounded pole. The one-shot circuit will be activated with transistor 32 being turned "off" and, transistor 26 turned "on" for a period determined by the time constants within the one-shot. Transistor 25 will be turned "on" by transistor 26 and transistor 27 will be turned "on" and energizing solenoid 28 for a period as determined by the one shot circuit.

While the starting solenoid 28 is energized, cranking power will be applied to the starter motor (DC generator 11) for a period of time as determined by the one-shot circuit. That is energization of solenoid 28 will connect the positive terminal of the battery 12 to DC generator 11 via contact on solenoid 28 and through diode 34. Application of battery power to the DC generator 11 will cause it to act as a cranking motor for starting the internal combustion engine. Concurrently with the application of cranking power, choke power is applied to solenoid 35 via additional contacts which have been actuated by solenoid 28. As the result of the application of cranking power the engine will start and its r.p.m. will increase, resulting in a build up of the AC and DC generated voltages. Within a few seconds the AC generator output will exceed 100 volts causing relay 15 to be energized. Energization of relay 15 will connect output AC power to output receptacle 14. Neon indicator lamp 36 will indicate the application of AC power to output receptacle 14. Concurrently, the DC generator 11 will provide an output DC voltage which exceeds the battery voltage (12) and diode 34 will be reversed-biased thus causing the cranking power to be terminated. The build-up of the DC output voltage from generator 11 will forward-bias charging-diode 29 permitting a charging current to be applied to battery 12.

After the initiation of the start cycle the one-shot circuit will switch off the starting solenoid 28 and de-energize the choke solenoid 35.

During the ensuing running cycle the AC generator output will be at 115 volts, 60 cycles and the DC generator output will be at 15 volts DC in order to charge the storage battery 12. The AC low-line return path is through diodes 17 and 18 alternately at a 60 cycle rate.

When the selector switch is returned to the "off" position the one-shot circuit 32–26 will be disconnected from the battery power and the timing capacitor within the one-shot circuit will be discharged through the "off" contact of switch 13B. Switch 13A will turn off transistor 20, network 22, transistor 21 and immediately thereafter relay 23 will be de-energized. Concurrently the trigger capacitor 31 will be discharged by the off contacts of relay 23. At the same time damping resistor 37 will be inserted into the primary circuit of the magneto coil of the internal combustion engine, by the open contact of relay 23. As a consequence the magneto coil 33 will cease to deliver voltage to the spark plug 38, causing the engine to cut off and slow down. As the engine slows down the indicator lamp 36 will be extinguished and the generator output voltages will decrease towards zero. A further reduction in the generated voltages will reverse bias diode 29 thereby terminating the battery charging current to the battery 12. The reduction of the AC generated voltage will permit relay 15 to open and thereby disconnect the AC generator output from the receptacles 14. Within approximately five seconds the engine and generator will stop completely and the system will be returned to the previously described "off" or standby mode of operation.

The operation of the control unit under the "auto" mode of operation is essentially the same as the previously described "on" mode of operation. However, during automatic operation the starting cycle is made responsive to a demand for power as may result from the connection of an external load across the AC receptacles 14. Conversely the power plant must automatically be shut down upon removal of the external load. During the automatic mode of operation the generator must reliably be started regardless of the size of the external load. Furthermore, the first load which demands power must cycle the control unit through a start and run cycle and any additional loads must not recycle the control unit. Conversely, only the last load to be removed from the power receptacles 14 must be effective to cycle the control unit to a stop with the removal of any previous load not effecting the stop cycle.

A fail-safe feature is provided whereby the control unit responds only once to a power demand to initiate a single start cycle. If this start cycle should fail upon a demand, the control unit will revert to a stalled mode rather than to attempt to recycle the start procedure. This fail-safe feature is especially important in case the engine is out of fuel, in which case the starting battery is prevented from being completely discharged by attempting a continued series of ineffective start cycles. However, if a start cycle fails under automatic operation, the control unit may be reset for a new start, either locally at the control unit or remotely at the situs of the applied load.

As will be seen from the ensuing description, the control unit will effect an automatic stop cycle in the event that a fuse should open due to an overload and the control unit will prevent an attempted restart cycle until the defective fuse has been replaced, and the control unit is reset as previously mentioned. In addition to the automatic starting of the power plant in response to the application of an external load, the apparatus may be made responsive to a main power failure when the system of the invention is employed in an emergency standby service That is, the AC output of the generator may be connected to the main power lines automatically in the event of a power failure and automatically switched back to main power when service is resumed. This transfer for emergency standby service may be put into operation as many times as the call for emergency power is demanded. This mode of operation is accomplished when the mode selector switch is set to the "automatic" position and the unit is properly connected to the main power lines through the addition of a relay box as the media from which the power to the load is automatically switched from main power to auxiliary power and back to main power as the main power is interrupted and resumed.

The operation of the system during the "start" cycle under "automatic" mode of operation will now be described, Switch 13 is turned from the "off" position to the "automatic" position and the one-shot circuit 32–26 will be activated in the manner previously described in connection with the manual "on" mode of operation. This is performed by switch 13B. The "auto" position for switch 13A is an open circuit; therefore, the energizing signal for relay 23 which must be obtained from transistor 21 and delay network 22 will now have to be supplied by transistor 20. For convenience in describing the operation of the automatic-mode circuit it will be assumed that an external load in the form of a lamp will be connected to receptacle 14, with its switch turned off. One terminal of resistor 30 is connected to the battery 12. The other terminal of resistor 30 is connected to the off contact of relay 15, and is transferred by the pole contact of relay 15, to fuse 16, and on to receptacle 14. When the lamp switch is closed, current will be supplied by the battery to resistor 30 and then through the path extending through relay 15 off contacts, and through fuse 16 to the high side of receptacle 14. The path then continues through the lamp to the low side or receptacle 14 and on through the combination of diode 18, resistor 19, capacitor 39 and the low side or ground of the battery 12. As the current path is completed through the forward biased diode 18, the voltage drop across diode 18 will forward bias transistor 20 causing it to be turned on. The output of transistor 20 will be delayed via the delay network 22. The delayed output will forward bias transistor 21 which in turn energizes relay 23, and the events that follow to the start of the engine are identical with those previously described in connection with the "on" mode of circuit operation.

As the output of the AC generator 10 increases, relay 15 will close transferring the generator output to receptacle 14 and at the same moment breaking the path for resistor 30. During the transition of relay 15 the capacitor and delay network 22 will have enough stored energy to supply a continuous forward bias to transistor 21 and thereby hold relay 23 energized without interruption. The capacitor and delay network has only enough stored energy to deliver a forward bias to the transistor 21 for approximately $\frac{1}{10}$ second which is more than sufficient time for relay 15 to go through its transition, connecting the generated AC to the lamp, which then returns through the low side of receptacle 14. The circuit path is completed alternately through diodes 17 and 18 to the low side of the AC generator. On the positive cycle of the generated alternating current, diode 18 is forward biased and transistor 20 is now amplifying the positive voltage drop across diode 18. As the generated alternating current goes negative, diode 17 becomes forward biased and will conduct the generated AC on through to the low side of the generator, but the voltage drop across diode 17 is not amplified by transistor 20 as the polarity of this voltage has reversed biased transistor 20. Thus, transistor 20 only amplifies the forward drop across diode 18 at the frequency of the generated alternating current and applies this pulsating voltage to the network 22 for filtering before it is applied to transistor 21 as a forward bias voltage.

The generator will continue to run until such time as the lamp switch is turned off, whereupon the generated alternating current path is broken to the lamp and subsequently to diodes 18 and 17. The absence of a signal at the input of transistor 20 will cause the transistor to cease conducting and subsequently relay 23 will insert resistor 37 into the magneto primary to shut down the engine. The one-shot circuit 32 and 26 continues operating in its standby state and transistor 20 continues to monitor the AC lowline for a forward voltage drop across diode 18 in order to turn on when the demand for power is again impressed across receptacle 14.

Resistor 19 and capacitor 39 neutralize the effects of cable capacity of long-lines running from the output receptacle to the load.

It has been found necessary to provide means for overcoming the distributed capacitance of the power cable inasmuch as the capacitive reactance of the cable may be sufficiently low at the operating frequency as to draw enough current to maintain a forward voltage drop across diodes 18 and 17; consequently transistor 20 would amplify this signal just the same as if a load were placed across the line. Turn-on of the control unit does not result in this problem since the turnon signal is a direct-current voltage, and the distributed capacitive reactance to such a signal is infinite. Due to the high sensitivity of the control unit to the smallest load demands, neutralization of cable capacitance is essential and comprises parallel resistor and capacitor 19 and 39, respectively.

Cable lengths of several hundred yards can be neutralized by resistor 19 and capacitor 39, and parallel power lines with conductor separation of one foot may be run for a distance of a mile or more.

Among the other desired operating requirements for the apparatus of the invention are that additional loads may be switched in or out while the generator is running without causing recycling of the starting sequence or in any way affecting the running operation of the control unit. The first load connected to the generator will cause diodes 17 and 18 to be forward biased alternately, with transistor 20 receiving its forward bias signal from diode 18 on every positive cycle of the generated alternating current. Additional applied loads will only draw more current through diodes 18 and 17, and the forward voltage across these diodes will remain essentially the same. Therefore, the forward bias as applied to transistor 20 for various power loads will also be essentially the same and no changes in operation in the control unit will result. This same principle applies if the power consuming loads are switched off, with the last load removed initiating the "off" cycle.

In a practical application, external loads ranging from a minimum of one watt up to the maximum capability of the generator 10 will initiate the turn-on or turn-off cycle of the control unit.

If for any reason the generator should fail to start when the demand is made for power, the control unit will not attempt another start cycle until it is reset either at the generator site or at the point of load demand. This is accomplished in the following way: the one-shot circuit (32 and 26) receives its trigger pulse from capacitor 31 which must be grounded by the contacts of relay 23, when energized. To trigger the one-shot again, relay 23 would have to be de-energized momentarily to discharge capacitor 31, which then could trigger the one-shot when relay 23 is energized. If the engine fails to start, relay 23 would stay energized indefinitely, due the constant forward bias on the transistor 20 as supplied by resistor 30 via the fuse 16, the load, and the forward bias on diode 18. The reset can be made at the control unit by momentarily switching switch 13 to the "off" position and back to the "automatic" position. Similarly, the reset can be effected at the point of the load demand by switching the load momentarily "off" and then "on" again. Either way, relay 23, will be momentarily de-energized and capacitor 31 discharged, making it ready to trigger the one-shot circuit again.

If fuse 16 should be due to an overload, the effect of the control unit would be the same as if the load were to be switched "off" and the generator would come to a stop. Replacing the fuse would complete the path for resistor 30 through the load, and to diode 18 and transistor 20. Thus, the start cycle would be initiated automatically.

With the addition of 115-volt double-pole double-throw relay, the generator may be operated in an automatic mode for emergency standby service without the need for manual intervention.

Figure 2:
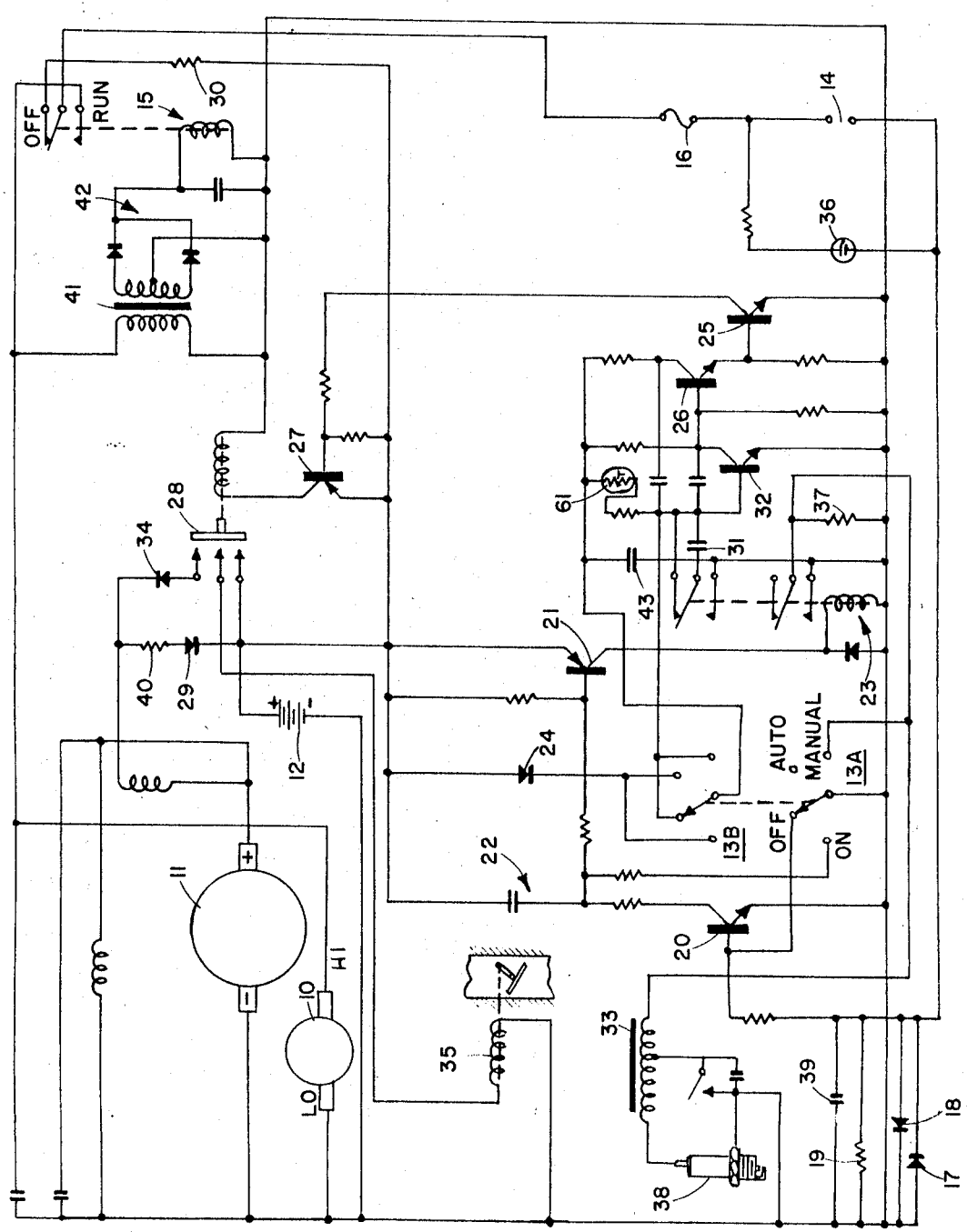
FIGURE 2 is a schematic scircuit diagram of the apparatus of FIG. 1.

Circuit details of the block diagram of FIG. 1 are shown in FIG. 2. Referring to FIG. 2 the functioning of the circuit during a starting sequence will now be described.

Switch 13 is turned from the "off" position to the "on" position thus causing 13B to remove the short across the timing capacitor of the one-shot circuit (32 and 26). Battery voltage will be applied to the collectors of both transistors 32 and 26 and the timing capacitor will be charged to the supply voltage. The capacitor must be fully charged and the one-shot circuit must be in its standby state before a trigger pulse can be applied to the one-shot to reverse its conducting state. The time required for transition is approximately 0.2 second from the quiescence steady state operation of transistors 32 and 26, with the transistor 32 fully conducting and transistor 26 cut off. The pulse which triggers the one-shot is delayed approximately 0.5 second by the filter and delay network 22 which is a double function network, with the delay function being utilized for the "on" sequence. When switch 13 is turned from the "off" position to the "on" position, switch section 13A will activate the delay network 22. The network 22, being a passive resistance capacitive network, will be charged by the battery supply voltage and at approximately 250 milliseconds after it has been energized the voltage across the capacitor of the network will be sufficient to forward bias transistor 21. This action will cause transistor 21 to conduct and energize relay 23.

Capacitor 31 which was discharged across the shorted contacts of relay 23 before the relay was energized, is now switched to the grounded contact of relay 23. Therefore, capacitor 31 will apply a reverse bias voltage to the saturated one-shot transfer 32. This in turn saturates transistor 26 for an interval as established by the timing networks comprised of resistance and capacity within the one-shot circuit. At the same moment the adjacent set of contacts of relay 23 will have shorted out the damping resistor 37 and return the magneto coil 33 to its normal operating configuration.

Transistor 26 which is now fully turned on for a period as determined by the timing network applies a forward bias signal to transistor 25. Upon being fully turned on, transistor 25 will in turn supply a driving current to transistor 27. Turning on transistor 27 will supply the necessary current to energize the starter solenoid 28. The energized starter solenoid connects a set of three contacts together, two of which are high-current contacts and one of which is a low-current contact. The application of an energizing current through the low-current contact to the choke solenoid 35 will cause the engine to be choked for the duration of the one-shot signal. The high-current contacts of the starter solenoid 28 supply cranking power to the series field of the DC generator through the forward-biased diode 34. The DC generator is now being used as a driving motor for cranking the engine to start it. As soon as the engine starts, and comes up to speed, the DC generator overcomes the battery voltage by its own generated voltage. This will cause diode 34 to become reversed biased in order to prevent the armature of the DC generator from trying to supply an excessive amount of current back through the closed contacts of solenoid 28 to battery 12. At such time as the generator output exceeds the battery voltage, diode 29 will then be forward biased and a charging current, limited by resistor 40, will safely maintain the battery charging level at a rate of approximately four ampere hours.

As the engine is coming up to speed (still within the period of the one-shot) the AC generator 10 will be supplying excitation voltage to transformer 41. The primary-to-secondary turns ratio of transformer 41 is so adjusted that when the output from the generator 10 reaches approximately 100 volts and is rectified and filtered by network 42, an energizing current will be supplied to relay 15. At that time, relay 15 will close and connect the AC output of the generator 10 through the relay contacts and fuse 16 to the output receptacles 14. The purpose for delaying the application of the AC voltage to the receptacles 14 to a time when the generator reaches approximately 100 volts AC is to prevent the generator from being loaded during the start-up cycle. In return less starting current is required from the battery and quicker starts are possible especially when the engine is cold. The neon indicator lamp 36 provides a visual check to the operator to indicate that AC voltage is available at the output receptacles 14. An incandescent lamp cannot be substituted for the neon lamp because when the generator is used in the automatic mode of operation an incandescent lamp would present a load to the sensing circuit which could not be differentiated from an actual external load and the generator would run continuously.

When the generator has reached its full operating speed and is delivering 115 volts AC to the output receptacles, the battery will be charging. As the one-shot is approaching its duration limit, the circuit can no longer maintain a sustaining charge current through the timing capacitor and the one-shot will revert back to its quiescent steady-state condition in which transistor 32 is fully conducting and transistor 26 is reversed-biased to cutoff. Transistors 25 and 27 will then become reversed biased and solenoid 28 will be de-energized. Energizing current is removed from the choke solenoid 35 and the engine choke returns to normal. Also, battery voltage is removed from the anode of diode 34.

Diode 24 and capacitor 43 provide an armature noise decoupling voltage to the one-shot circuit to prevent armature noise from randomly triggering the one-shot circuit.

The AC low-line return path from receptacle 14 is through diodes 17 and 18, alternately at a 60 cycle rate, and then to the low side of the AC generator. This circuit, along with resistor 19 and capacitor 39, are employed in the automatic start cycle and will be described hereinafter in connection with that mode of operation.

Switch 13, upon being returned to the "off" position, will result in the following events: switch section 13B disconnects the one-shot 32 and 26 from the battery voltage via diode 24 and shorts out the timing capacitor with the off contact of the switch. It is important that the timing capacitor be shorted for the reason that should the switch be turned to any of the other positions, or randomly rotated, the one-shot must be reinstated to its quiescent state each time the switch picks off the battery supply voltage by the self priming action of the timing capacitor as it charges to the battery supply voltage. Otherwise, the one-shot would erratically be triggered off by itself as power is applied to it in any random manner.

As switch section 13B de-energizes the one-shot in the "off" position, switch 13A clamps a reverse bias on transistor 20.

This will cause transistor 21 to be turned off and thereby de-energize relay 23. The contacts of relay 23 which trigger the one-shot on through capacitor 31 will now short out capacitor 31 and make this capacitor ready to trigger the one-shot again, at such time the demand is made in either the "on" or "auto" position.

The remaining set of contacts on relay 23 will at the same time place resistor 37 into the primary of the magneto coil. Resistor 37 when inserted in series with the primary of the magneto coil will absorb the energy induced in the coil by the coupled rotating magnet, and reduce the secondary voltage of the magneto coil to a value below that which will sustain sparkplug ignition. Merely opening the primary of the coil will not always de-energize the magneto coil inasmuch as enough stray capacity may exist between the windings of the coil and the iron core to result in a return path to ground which could sustain enough power in the magneto coil to fire the sparkplug. The stray capacitor cannot absorb energy as is the case with a good capacitor, therefore, a resistor inserted into the primary of the coil will absorb the spurious energy and prevent the further ignition.

With the ignition cut off, the generator begins to slow down to a stop. As a consequence, the output of the DC generator 11 will drop below the voltage level of the battery 12 and the diode 29 will become reverse biased and the charging current to the battery will cease. The output of the AC generator will also decrease, and the DC control signal derived therefrom, via transformer 41, rectifier 42, and capacitor 43, will be too low to maintain relay 15 energized. Thus, the generator 10 output will be disconnected from fuse 16 and receptacles 14. De-energization of relay 15 will establish the stand-by control circuit by connecting resistor 30 from the battery to the receptacles 14, via fuse 16. A small current will be supplied via resistor 30 to any external load connected to receptacles 14, and this current will be used to initiate an "automatic" start cycle, assuming switch 13 is in the "auto" position.

There is shown in FIG. 3 a modification of the invention incorporating an alternate method of sensing an external load. Other features of this embodiment will also be described. Similar parts, having like reference numbers throughout the several views, perform the identical functions and will not be further described except as necessary to expalin the modified portion of the invention.

In the embodiment of FIG. 3 a split-single phase, 230 volt AC alternator 44A and 44B is employed in lieu of the single-phase 115 volt AC generator (10) of FIGS. 1 and 2. This permits 115 volt AC power to be obtained at convenience receptacles 14A and 14B, and 230 volt AC power to be obtained at receptacle 14C. The separate outlet receptacles are fused by means of fuses 16A and 16B. The battery charging circuit previously used to charge the starter battery 12 of FIG. 1 is comprised of diodes 29A and 29B, resistor 40 and transformer 48 in the circuit of FIG. 3. Additionally, transistor 60, diodes 45 and 46, and capacitor 47, comprise a starter override circuit. Transformer 48 has its primary winding energized from the alternator 44A, and its center-tapped secondary winding supplies the power to diodes 29A, 29B, resistor 40 and battery 12. Inasmuch as battery 12 is directly charged via diodes 29A and 29B, and resistor 40, the starter motor 49 is not needed to act as a DC generator for charging the battery (as is the case in FIG. 1). Reverse current protection is unnecessary, therefore, this arrangement obviates a blocking diode between starter 49 and the contacts on start solenoid 28.

Unlike the previously described embodiment, the circuit of FIG. 3 employs a choke solenoid driver transistor 50, which is activated by transistor 25 to control the choke solenoid 35 in lieu of an additional contact on the start solenoid 28. This permits power to be applied to the choke solenoid for the entire duration of the one-shot signal regardless of the time at which the override circuit takes effect upon the starter circuit.

Other differences relate to the sensing circuit described hereinafter. The main power relay 15 is provided with a three-pole double-throw contact arrangement as opposed to a single-pole double-throw configuration as previously described. The AC return (low-side) line connects directly to the ground terminal of alternator 44A and 44B, thereby obviating diodes 17 and 18, resistor 19, and capacitor 39. Transistor 20 receives its turn-on signal from photoconductive cell 51.

Transistor 20 will be forward biased when the resistance of cell 51 is low, thus supplying the base of transistor 21 with sufficient current to cause it to saturate. This will occur when any one or more of the four lamps 52 through 55 are illuminated. These lamps (52–55) are placed in close proximity to cell 51 in a sealed enclosure impervious to external light rays.

Assuming that there is no external load connected to receptacles 14A, 14B and 14C, the circuit to the sensing lamps 54 and 55 via contacts of relay 15 will be opened and the lamps will remain dark. Therefore, cell 51 will have a high resistance and transistor 20 will not be forward biased to cycle the control unit on. Connecting an external load to receptacle 14A will complete the circuit to lamp 54 (the return path is via battery 12 to the grounded side of receptacle 14A). This will illuminate lamp 54 and reduce the resistance of cell 51. As a result, transistor 20 will conduct and thereby forward bias transistor 21 via network 22. This in turn energizes relay 23 and triggers the one-shot circuit in the manner previously described. Hence, the start cycle is initiated.

As the alternator 44 approaches an output voltage of approximately 100 volts AC, relay 15 will be energized via transformer 41B and diodes 42A and 42B. The three poles of relay 15 will be switched to the power-on contacts and the load will be connected to the output of the alternator 44A through diodes 56 and 57.

Lamp 54 will then extinguish as a result of relay 15 opening its off-sensing contacts. However, running-power sensing lamp 52 will become illuminated due to the voltage drop across diodes 56 and 57 caused by the load current through them. Thus, cell 51 will maintain its low resistance and continue to furnish transistor 20 with a forward bias current. Removal of the external load will remove the voltage drop across diodes 56 and 57, and lamp 52 will extinguish. The cell 51 resistance will increase, removing the forward bias to transistor 20, causing the engine to shut down as previously described.

The connection of an external load to receptacle 14B initiates a similar starting function except that diodes 58–59 cause lamp 53 to be energized following the lighting of lamp 55.

Lamp 55 is also employed when receptacle 14C is connected to an external load. Initially the upper terminal (as seen in FIG. 3) of receptacle 14C is grounded through a pole contact of relay 15. This circuit is functionally equivalent to the circuit of receptacle 14B. When the load is applied to receptacle 14C, lamp 55 will be energized and the alternator 44 will start up. Relay 15 will be energized when the alternator's output reaches approximately 100 volts AC. The upper terminal of receptacle 14C will then be transferred to the upper terminal of receptacle 14A and the full 230 volt AC output of the alternator 44A and 44B will be supplied to receptacle 14C. At this time diodes 56, 57, 58, and 59 will supply the power to lamps 52–53.

When the external load is removed, both lamps 52 and 53 will be extinguished, and the alternator will be shut down.

Selector switch 13 functions in the same manner as described in connection with FIG. 2.

Thermistor 61 alters the duration of the one-shot "on" signal with respect to the ambient temperature. As the ambient temperature decreases, the thermistors resistance will increase and the duration of the one-shot "on" signal will be lengthened and consequently the cranking time and choking time will proportionately be lengthened. Conversely, as the ambient temperature increases, the thermistor resistance will decrease, shortening the one-shot "on" time which will proportionately decrease the cranking and choking time. This performance simulates very closely conditions normally encountered when starting gasoline powered combustion engines at various ambient temperatures.

It should be noted that when a battery is not available or is discharged beyond the cranking power, the generator can be started manually with the rope start normally provided on the engine. In this case, the choke has to be operated manually, as the choke solenoid 35 receives its power from the battery when electric cranking power is applied.

Switch 13 is turned to the "MANUAL" position, with switch 13A shorting out the damping resistor 37, grounding the primary of the magneto coil to its running configuration. Switch 13B disconnects the one shot circuit 32 and 26 from diode 24, and from any voltage that may appear on the 12 v. DC line due to the output of the DC generator after the engine is started.

The engine is started by the rope starter and the AC output of the generator, when transformed by 41 and filtered by 42 energizes relay 15, and connects the output of the AC generator to the output receptacle. The DC generator output levels out at approximately 15 v. DC, and the 12 v. DC line rises to this voltage via resistor 40 and diode 29 if a battery is not connected to the terminal lugs. This has no ill effect on the circuitry, even greater voltage and transient voltages can be handled by the subject invention.

As a load is connected to receptacle 14 and switched on, relay 23 is energized via transistor 21, network 22, transistor 20, and diode 18 but, no triggering on the one shot 32 and 26 occurs, as the one shot is disconnected from the supply voltage, therefore transistors 25, 27, and solenoid 28 continue quiescent.

Once the engine is started and both the AC and DC generators are at their full output capabilities, and a load which has its own automatic cut off feature is plugged into receptacle 14 and drawing power, the generator can be turned off automatically by advancing switch 13 to the "AUTO" position, which then transfers the magneto primary to relay 23 contacts, which are closed due to the load on the line. When the load is turned off, the absence of signal at diode 18 reverse biases transistors 20 and 21, and de-energizes relay 23, which then inserts resistor 37 into the primary of the magneto coil 33, and turns the engine off. Automatic start is not possible without battery power, and a re-start has to be performed with the rope starter, and switch 13 in the "MANUAL" position.

From the foregoing, it will be apparent that the various structures shown and described herein are illustrative and that various modifications can be made without departing from the spirit and scope of my invention. Accordingly, I do not intend that my invention be limited, except as by the appended claims.

I claim:

1. In an engine-driven power plant, an automatic control system comprising:
   a storage battery;
   motor-generator means drivingly coupled to said engine and adapted to drive said engine when energized from said battery, and to be driven by said engine for generating a charging current;
   start control means for selectively completing a circuit path between said battery and said motor-generator means;
   first diode means interposed in said circuit path to permit current to flow from said battery to said motor-generator means and thereby drive said engine;
   time delay means responsive to said start control means for interrupting said circuit path after a predetermined interval; and
   second diode means connected between said motor-generator means and said battery to permit said battery to be charged when said motor-generator means is generating said charging current, and to isolate said battery from said motor-generator means when said motor-generator means is not generating said charging current.

2. Apparatus for controlling a power plant, comprising in combination:
   an internal combustion engine;
   a storage battery;
   motor-generator means drivingly coupled to said engine and adapted to drive said engine when said motor-generator means is energized by said battery, and to be driven by said engine when said engine is self-running for generating a charging current;
   start control means for selectively completing a circuit path between said battery and said motor-generator means;
   first diode means interposed in said circuit path whereby current may flow from said battery to said motor-generator means for energization thereof;
   time-delay means responsive to the selective operation of said start control means for opening said circuit path at the termination of a given time interval;
   second diode means directly connected between said motor-generator means and said battery to permit said charging current to be supplied to said battery when said engine is self-running; and
   a power generator driving coupled to said engine to generate power for use by an external load.

3. Apparatus as defined in claim 2 including:
   a second time-delay means interposed between said power generator and said external load for delaying the application of power thereto until said engine is free running.

4. Apparatus as defined in claim 2 including:
   a loading sensing circuit means interposed between said external load and said start control means, and responsive to said external load to selectively operate said control means.

5. Apparatus as defined in claim 2 including:
   means connecting said power generator to an external power distribution system; and
   network means connected to said distribution system to neutralize the capacitance effects thereof.

6. Apparatus as defined in claim 2 including:
   stop control means connected to said engine for selectively disabling the self-running operation of said engine.

7. Apparatus as defined in claim 2 including:
   a load sensing circuit means interposed between said external load and said start control means, and responsive to said external load to selectively operate said start control means; and
   stop control means connected to said engine for disabling the self-running of said engine whenever said external load is reduced below a predetermined value.

8. Apparatus as defined in claim 2 wherein:
   said motor-generator comprises a direct-current generator;
   said power generator comprises an alternating-current generator; and
   said time-delay means comprises a transistorized one-short multivibrator.

9. Apparatus for controlling a power plant, comprising in combination:
   an internal combustion engine;
   a storage battery;
   starter-motor means adapted to be drivingly coupled to said engine when energized by said battery;
   start control means for selectively completing a circuit path between said battery and said starter-motor to start said engine;
   an alternator coupled to said engine to be driven thereby;
   means responsive to the output of said alternator for causing said start control means to open the path between said battery and said starter-motor; and means responsive to the application of an external load to said output of said alternator for causing said start control means to start said engine.

10. Apparatus for controlling a power plant, comprising in combination:
an internal combustion engine;
a storage battery;
starter-motor means adapted to be drivingly coupled to said engine when energized by said battery;
start control means for selectively completing a circuit path between said battery and said starter-motor to start said engine;
an alternator coupled to said engine to be driven thereby;
means responsive to the output of said alternator for causing said start control means to open the path between said battery and said starter-motor;
a pair of back-to-back diodes in series with output connecting means; and
means responsive to a voltage drop across said diodes to cause said start control means to start said engine.

11. Apparatus for controlling a power plant, comprising in combination:
an internal combustion engine;
a storage battery;
starter-motor means adapted to be drivingly coupled to said engine when energized by said battery;
start control means for selectively completing a circuit path between said battery and said starter-motor to start said engine;
an alternator coupled to said engine to be driven thereby;
means responsive to the output of said alternator for causing said start control means to open the path between said battery and said starter motor; and
temperature responsive means for altering the cranking time and choking time of said engine.

12. Apparatus as defined in claim 11, wherein said temperature responsive means is a thermistor.

References Cited

UNITED STATES PATENTS

| | | | |
|---|---|---|---|
| 2,307,364 | 1/1943 | Elkin | 290—31 |
| 3,047,725 | 1/1962 | Spinelli et al. | 290—36 |

ORIS L. RADER, Primary Examiner

W. E. DUNCANSON, Jr., Assistant Examiner

U.S. Cl. X.R.

290—36